(12) United States Patent
Cornell

(10) Patent No.: US 6,494,166 B1
(45) Date of Patent: Dec. 17, 2002

(54) ELECTRONIC DEER CALL

(76) Inventor: Bradley Allen Cornell, 641 Indian Creek Rd., Ingram, TX (US) 78025

(*) Notice: Subject to any disclaimer, the term of this patent is extended or adjusted under 35 U.S.C. 154(b) by 0 days.

(21) Appl. No.: 09/876,855

(22) Filed: Jun. 7, 2001

(51) Int. Cl.[7] ................... A01M 31/00; A01K 29/00
(52) U.S. Cl. .................. 119/174; 119/719; 446/397
(58) Field of Search ..................... 119/174, 57.91, 119/718, 719, 839; 43/1, 2, 3; 446/397; 367/139

(56) References Cited

U.S. PATENT DOCUMENTS

| 4,896,305 | A | * | 1/1990 | Gimbal ..................... 367/137 |
| 4,945,859 | A | * | 8/1990 | Churchwell ............. 119/57.91 |
| 5,503,585 | A | * | 4/1996 | Heineman ................. 446/397 |
| 6,003,261 | A | * | 12/1999 | French ............................ 43/1 |
| 6,226,229 | B1 | * | 5/2001 | Dinardo ..................... 367/139 |
| 6,289,626 | B1 | * | 9/2001 | Williams ........................ 43/2 |

* cited by examiner

Primary Examiner—Robert P. Swiatek
(74) Attorney, Agent, or Firm—John R Casperson

(57) ABSTRACT

Deer are attracted by playing the sound of a deer feeder distributing feed.

9 Claims, No Drawings

ELECTRONIC DEER CALL

BACKGROUND OF THE INVENTION

This invention relates generally to an electronic call for deer, especially North American whitetail deer, although it is expected that other types of animals, such as hogs, will also respond to the call.

Prior art deer calls relied on mimicking deer sounds, mostly bleats and grunts. Others have noted that deer, being curious, will sometimes investigate calls which mimic the sounds of other species, such as of a shrieking rabbit.

However, such calls usually do not attract deer and it is possible that deer become educated over time and do not respond to calls that they have heard before and investigated. For example, wise old bucks, which are the most sought after, may have investigated a call earlier in life and avoided harvest, and have learned not to respond to the call when they hear it later.

A new call would be very desirable.

SUMMARY OF THE INVENTION

I have noted that deer are drawn to the sound of a deer feeder in operation. I have found that deer are also attracted by a playback of a recording of such sound. My invention is a method for attracting deer by electronically mimicking a sound generated by flowing particles of feed from a deer feeder.

DETAILED DESCRIPTION OF THE INVENTION

Generally speaking, the invention is to electronically mimic a sound generated by flowing particles of feed from a deer feeder. For the most desirable results, the sound should be generated in an area which contains deer, although it is expected that the sound would also be effective in attracting hogs or other wildlife which can be expected to feed under deer feeders. Deer feeders are legal in many states, and are widely used in some areas, such as Texas. However, even outside of areas in which the feeders are widely used, it can be expected that some deer will be drawn to the sound, as they are curious animals by nature.

It is best to set up for playback in a hide or blind in an area which contains at least one deer feeder, preferably within about 100 yards of the feeder. However, deer naturally roam over an area of a few square miles, and have very acute hearing. It can thus be expected that most all deer with about 2 miles of a feeder will be familiar with the sound it makes when distributing feed, and will therefore at times respond to the call.

Most deer feeders are contrived to flow particles of feed onto the ground from time to time, usually at predetermined times every day. It may be best to use the new call in conjunction with a feeder which is contrived to distribute feed at unpredictable times, at least from a deer's point of view. That way, the call will seem less out of the ordinary, and the deer will be more likely to respond without customary caution.

Many deer feeders distribute particles of grain over a fairly large area, such as in the range of from about 20 to 2000 square feet, since distributing the feed in this manner make it more difficult for deer to get their fill, and thus holds them in the area of the feeder for longer periods. It also makes it more likely that some morsels will be overlooked, which tends to draw hungry deer throughout the day.

The feeders commonly achieve this distribution by impacting the feed against a thin metal plate, which produces a tinkling or pinging sound. It is this sound that is preferably electronically mimicked, preferably by playing a recording of an actual deer feeder distributing particles of feed. As most deer feeders employ a rotating plate beneath a bin of corn or feed pellets, the sound produced is generally that made by impacting corn or feed pellets against a rotating thin metal plate.

Electronic game call playback devices are used by varmint hunters and sometimes by waterfowl hunters. These known devices would be highly suitable for use in conjunction with device-compatible recording in accordance with the invention. However, other playback devices, such as a mini-cassette Dictaphone device would also be expected to prove useful, since deer have extremely acute hearing and a deer feeder is not naturally as loud as a shrieking rabbit or a flock of geese. The playback need not be as powerful as would be used for varmints or waterfowl, and is preferably is of a quality and volume so as to closely replicate an actual feeder.

While certain preferred embodiments of the invention have been described herein, the invention is not to be construed as being so limited, except to the extent that such limitations are found in the claims.

I claim:

1. A method for attracting deer comprising electronically mimicking a sound generated by flowing particles of feed from a deer feeder in an area frequented by deer.

2. A method as in claim 1 which is carried out by playing a recording of the sound in an area frequented by deer.

3. A method as in claim 2 in which the area contains at least one deer feeder.

4. A method as in claim 3 wherein the at least one deer feeder is located within about 2 miles of a location where the sound is electronically mimicked.

5. A method as in claim 4 wherein the at least one deer feeder flows particles of feed onto the ground from time to time.

6. A method as in claim 5 wherein the at least one deer feeder distributes the particles of feed onto the ground by impacting the particles against a thin metal plate, producing a tinkling sound.

7. A method as in claim 6 wherein the sound which is electronically mimicked is the tinkling sound of a deer feeder.

8. A method as in claim 7 which is carried out by playing a recording of a deer feeder distributing particles of feed.

9. A method as in claim 8 wherein the recording is of a deer feeder distributing particles of feed selected from corn and feed pellets by impacting the particles against a rotating thin metal plate.

* * * * *